United States Patent

[11] 3,602,432

[72] Inventor Richard C. Mulready
Jupiter, Fla.
[21] Appl. No. 729,494
[22] Filed May 10, 1968
[45] Patented Aug. 31, 1971
[73] Assignee United Aircraft Corporation
East Hartford, Conn.

[54] WAFER NOZZLE
7 Claims, 5 Drawing Figs.

[52] U.S. Cl. ....................239/265.11, 60/263, 60/271, 239/555
[51] Int. Cl. ....................B63h 11/00
[50] Field of Search ....................239/265.11, 555; 60/265, 271

[56] References Cited

UNITED STATES PATENTS 2,825,203 3/1958 Bertin et al. .................. 138/44
2,967,393 1/1961 Von Braun .................. 60/230
3,115,747 12/1963 Ying-Nien Yu .................. 60/260

*Primary Examiner*—Samuel Feinberg
*Attorney*—Jack N. McCarthy

ABSTRACT: A nozzle for an exhaust duct is built up out of a plurality of wafers. Each wafer has on each side thereof a contour of one side of a two-dimensional nozzle along with one side of an inlet passageway thereto. When the wafers are stacked, adjacent wafers form an inlet passageway along with the converging and diverging portions of a nozzle; it can be seen that the nozzle is a two-dimensional one having a relatively long lateral dimension as compared to the size of the throat. Spacing means for precise spacing appear along the length of each wafer and at the end thereof. Means for positioning and holding the wafers so that a precise nozzle configuration can be obtained and maintained is also included.

INVENTOR
RICHARD C. MULREADY
BY Jack N. McCarthy
AGENT

WAFER NOZZLE

BACKGROUND OF THE INVENTION

This invention relates to nozzles and especially to one which is composed of a series of two-dimensional nozzle flow sections formed by individual wafers arranged in a cascade. This provides a very short nozzle length with accurate throat and contour dimensions for a given nozzle area. This type of nozzle with its short length, small throat height, and accurate contour dimension is of significant value in the use of a high-power gas dynamic laser for expanding the proper exhaust molecular mass fraction from a combustor to produce specie at the nozzle exit plane with a high potential for generating laser power. While the broad concept of providing a nozzle comprising a plurality of small nozzles instead of one large nozzle is not new as shown in U.S. Pat. No. 3,115,747, it can be seen that this construction of such a nozzle presents a patentable combination thereover.

SUMMARY OF INVENTION

In the nozzle construction disclosed, means have been included to provide for obtaining and maintaining accurate control of nozzle wafer positioning. Lands for precise spacing have been placed on each side of the wafers, at approximately the same lateral points thereon, so that lands of adjacent wafers come in contact with each other. The group of wafers forming a nozzle are assembled and means are provided to control relative longitudinal position and limit lateral movement. The means for limiting lateral movement of the wafers keeps such movement to a value where the mating lands of adjacent wafers will always be in contact. The wafers are positioned longitudinally by a surface on each end of each wafer, said surfaces being formed to mate with a cooperating full retaining edge. This invention permits the easy removal of the wafers from an exhaust opening and therefore provides an easy manner of replacing a portion of the nozzle if necessary; that is, if for some reason one of the nozzles receives an excess amount of heat so as to burn out the nozzle, the mere removal and replacing of two wafers places the full nozzle back in an operative condition. A nozzle can be formed having a high gas expansion ratio with the expansion being accomplished in a very short distance. Very long and narrow nozzles, which lend themselves to the optical cavity requirements for gas dynamic lasers, can be easily and precisely made of a plurality of two dimensional nozzles having very small throats.

DESCRIPTION OF THE PREFERRED EMBODIMENT

Figures 1, 2, 3, 4, 5:
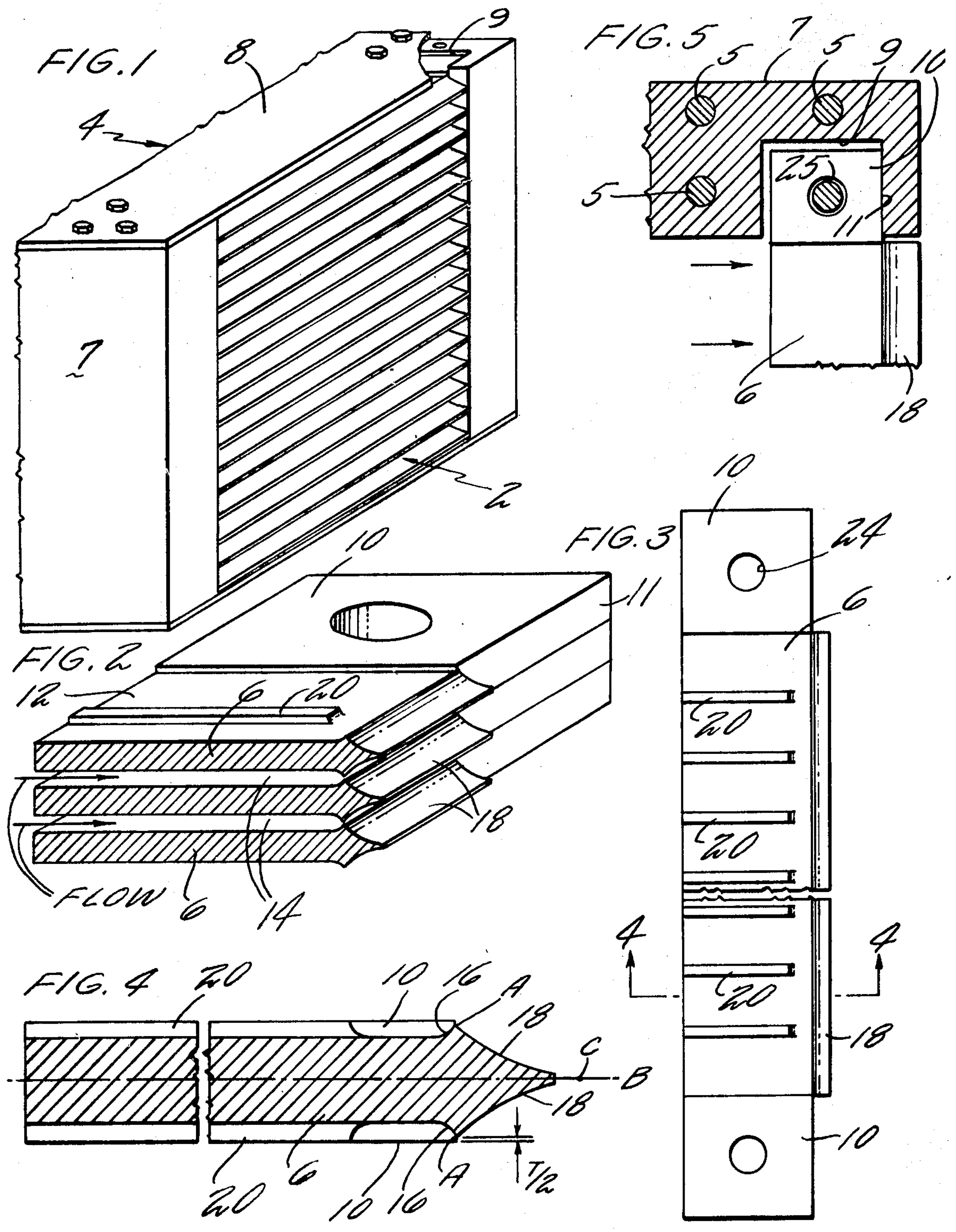
FIG. 1 is a view of a wafer nozzle on an exhaust duct.
FIG. 2 is an enlarged sectional view of three wafers removed from the wafer nozzle of FIG. 1.
FIG. 3 is a top view of one of the nozzle wafers with a center section broken away.
FIG. 4 is a view taken along the line 4—4 of FIG. 3 also with a center section broken away.
FIG. 5 is an enlarged view of a corner of a sidewall showing the positioning of the stacked wafers in the sidewall retaining slots.

In FIG. 1 a wafer nozzle 2 is shown in the end of a rectangular exhaust duct 4. The exhaust duct 4 is formed by sidewalls 7 and top and bottom walls 8. The wafer nozzle 2 is formed by stacking individual wafers 6 and maintaining them in said duct. Each wafer is formed (see FIGS. 3 and 4) from an elongated flat plate. Each plate is formed having a short flat section 10 on each side of each end for mating with adjacent wafers. This provides an end-spacing means. The portion of the plate between the short flat sections 10 is decreased in thickness as at 12 from the section 10 to provide one-half of the passageway 14 to be formed between two wafers.

The downstream end of each wafer is similarly contoured outwardly from a midline B on each side at 16 to a line A. From each line A the wafer is then similarly contoured inwardly towards a reference midline B on each side at 18 to a line C. The contours 16 and 18 can be made of any desired shape to arrive at a specific nozzle performance. The tip of the wafer may also be truncated such as shown in FIG. 4 at any point for the same reason.

Integral spacers 20 are placed along each side of the plate where it is decreased in thickness and extend to the same thickness as the short flat section 10. As the wafers are placed together, the short flat sections 10 contact each other as do the integral spacers 20. The sections 10 and spacers 20 maintain adjacent wafers in a precise position so that exact positioning of the end contoured sections will form a desired nozzle configuration having a precise throat dimension. As seen in FIG. 4, the throat dimension is determined by the location of line A and the height of the flat sections 10 and spacers 20. After a desired throat dimension T has been decided upon, one-half of this dimension, T/2, determines the spacing of the line A from the surface of the sections 10 and spacers 20.

To assemble and maintain said wafers in said duct 4, retaining slots 9 are formed from the top to bottom of each sidewall 7 at approximately the same longitudinal location along the duct.

Bottom wall 8 is bolted in position and the wafers 6 are stacked thereon with their sections 10 in the cooperating slots 9 of the sidewalls 8, (see FIG. 5). The wafers are loosely positioned in the slots to allow for thermal expansion. The rear surfaces 11 of the sections 10 are positioned facing the downstream sides of the slots 9. As flow begins, the force acting on the wafers properly positions them against the downstream sides of the slots, then the thermal growth in the height of the stack of wafers brings the top wafer into contact with the top wall 8 which is bolted to the wall 7 by bolts 5. The amount of growth after contact places the sections 10 and spacers 20 under a compressive force to maintain the wafers in position. Lateral movement of the wafers 6 is confined to the spacing provided between the holes 24 and a rod 25 positioned therein. This spacing is made such that the maximum lateral movement of one wafer to another will not permit the spacers 20 of one wafer to slide off the spacers 20 of an adjacent wafer. Each rod 25 extends for the height of the wafers and its lower end rests on bottom wall 8. It is to be understood that while the exhaust duct in FIG. 1 is shown as exhausting in a horizontal plane, it can be positioned so as to exhaust upwardly, or in any other direction.

Where thermal growth is not to be encountered, the wafers are placed in the slots to a height to have contact with the top wall 8 so that movement of the top wall 8 to contact the ends of walls 7 places the wafers under a compressive force. The wafers are properly aligned before the top wall is brought into final position against the walls 7.

While the flat sections 10 and spacers 20 are shown integral with the wafers 6, they can be made separately so that sections 10 and spacers 20 may all be varied in thickness to provide different nozzle throat openings. In a construction of this type, rods or other means would have to extend through the plates and spacers to maintain the spacers 20 in their proper location.

It is to be understood that the invention is not limited to the specific description above or specific figures shown, but may be used in other ways without departure from its spirit as defined by the following claims

I claim:

1. In combination, a duct having a longitudinal axis for directing the passage of fluids therethrough, said duct having a first groove on one side of said duct and a second groove on the opposite side of said duct, said first and second grooves extending at an angle to said axis, wafers placed across said duct with opposite ends retained in said respective grooves, said wafers being slidably received in said grooves and stacked one on the other to extend across said duct, said wafers having spacing means to provide flow therebetween, sides of adjacent wafers being contoured so as to form a two-dimensional nozzle when assembled, means for holding said wafers in contact when fluid is flowing through said duct.

2. A nozzle comprising a plurality of plates stacked together in contact forming a plurality of two-dimensional nozzles, said plates being formed on each side as one side of a two-dimensional nozzle, each plate having a spacing means at each end, adjacent plates having their spacing means contacting each other to properly space the cooperating sides of a two-dimensional nozzle, and means for holding said stack of plates in place when said nozzle is in use including means for slidably receiving said plates.

3. A nozzle as set forth in claim 2 wherein each plate has additional spacing means between said end spacing means.

4. A nozzle as set forth in claim 3 wherein said additional spacing means is elongated and extends perpendicular to the throat of the nozzle, said means for slidably receiving said plates including guide means for insuring that the cooperating elongated spacing means of adjacent plates will engage each other.

5. A nozzle as set forth in claim 2 wherein said means for holding said plates together includes two side members, each side member having a long groove for slidably receiving said plates therein, said grooves facing each other, each of said stacked plates having its ends thereof positioned in said grooves.

6. A combination as set forth in claim 5 wherein said plates with their spacing means have aligned openings therethrough, pin means extending through said openings to properly align them.

7. A combination as set forth in claim 1 wherein said wafers have holes extending through the ends which are retained in said grooves, a rod extends through said cooperating holes on each end of said wafers to properly position said wafers with respect to said duct and to each other.